United States Patent [19]

Gross

[11] 4,231,280
[45] Nov. 4, 1980

[54] INTERPENETRATING NAILABLE FASTENER FOR SHEET METAL

[76] Inventor: Jerome A. Gross, 6304 S. Rosebury, St. Louis, Mo. 63105

[21] Appl. No.: 888,139

[22] Filed: Mar. 20, 1978

[51] Int. Cl.² .............................................. F16B 15/00
[52] U.S. Cl. ........................................................ 85/31
[58] Field of Search ...................... 85/13, 30, 31, 26; 151/41.73, 41.72

[56] References Cited

U.S. PATENT DOCUMENTS

| 1,052,682 | 2/1913 | McCrea | 85/13 |
| 1,108,483 | 8/1914 | Abramson | 85/13 |
| 2,283,243 | 5/1942 | Vatet | 85/31 |
| 4,003,286 | 1/1977 | Hallock | 85/31 |

FOREIGN PATENT DOCUMENTS

| 117840 | 12/1943 | Australia | 85/31 |
| 870148 | 12/1941 | France | 85/13 |
| 91930 | 11/1947 | France | 85/31 |
| 509032 | 1/1955 | Italy | 85/31 |
| 46-16211 | 5/1971 | Japan | 85/31 |
| 778669 | 7/1957 | United Kingdom | 85/31 |

Primary Examiner—Thomas J. Holko

[57] ABSTRACT

For securing such materials as insulation to sheet metal, a nailable fastener has at one end of its metal shank three or more lobes which interpenetrate the sheet metal and bend radially outward to become firmly embedded in the sheet. Each lobe of the fastener, as manufactured, has an inner camming surface which slopes outward to the rounded outer surface, which is a continuation of the generally cylindrical shank. The intersection of these two surfaces forms a semi-elliptical cutting edge terminating in a tip. The tip and the cutting edge progressively slit and raise a pocket in the sheet for each lobe, as its inner camming surface bends the lobe outward. The resulting radial interpenetration secures and stabilizes the fastener.

2 Claims, 5 Drawing Figures

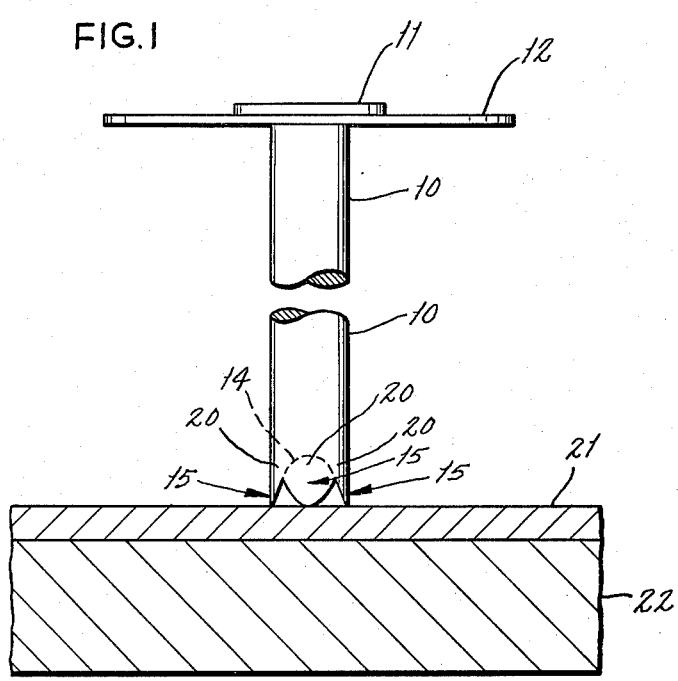
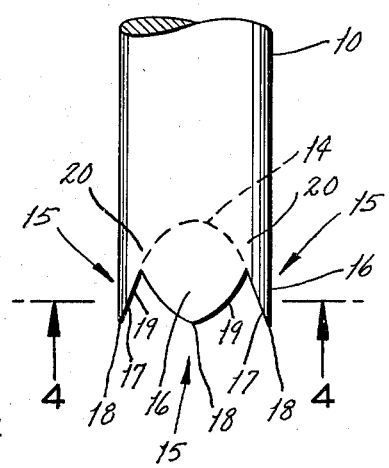
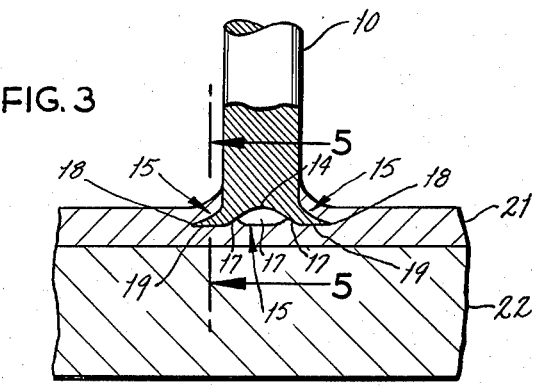
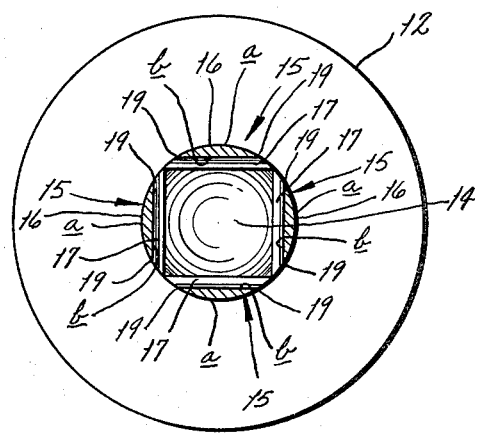
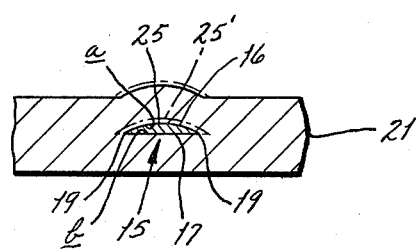

INTERPENETRATING NAILABLE FASTENER FOR SHEET METAL

BACKGROUND OF THE INVENTION

This invention pertains to fasteners for securing to sheet metal, and more particularly to that type of fastener which may be nailed directly into the sheet metal for attaching such materials as acoustical or thermal insulation without requiring total penetration of the sheet or engaging means in the reverse side.

A sheet metal fastener of this type is shown in U.S. Pat. No. 3,095,777. The disclosed fastener has a pair of opposed taperingly beveled jaws originally spaced from each other, which upon being driven into the sheet are clinched inwardly by their outer beveled surfaces, causing the jaws to grasp a small bulbous fragment of the metal. Close control of the driving force is required, since an excess force causes the jaws to close completely and bite the bulbous fragment entirely off, while an insufficient force results in insufficient clinching.

Fasteners for securing materials to and penetrating through sheet metal are known in the art. According to U.S. Pat. No. 3,645,163, a divided expanding nail type fastener having barbs along its shank pierces the sheet metal; the barbs catch in the reverse side and hold the nail in place.

One type of tubular rivet, used for interpenetrating and fastening together soft material such as leather, is shown in a patent to Bray, No. 180,747. That device comprises a short tubular shank whose end is beveled outwardly. Upon being driven into the leather, the beveled end deflects to clinch the pieces together, possibly splitting as it does so.

SUMMARY OF THE INVENTION

It is an object of the present invention to provide an improved fastener for securing material to sheet metal, which is capable of being installed by simple means, as by nailing, without close control of the driving force, yet which provides a secure attachment, resistive to both withdrawal and tilting. A further object is to provide a fastener which will neither penetrate entirely through the sheet into which it is being driven nor require engaging means on the reverse side thereof.

The improved fastener of the present invention includes a generally cylindrical metal shank portion whose end is characterized by having at least three interpenetrating lobes. The lobes each have an outer surface which is a continuation of the shank and an inner camming surface which slopes outward to a substantially semi-elliptical intersection with the outer surface; this line of intersection forms a cutting edge which terminates in a rounded tip. The tip and cutting edges are hardened, leaving the lobe base portions ductile.

Upon impact applied to the driving end of the shank, the tips enter the surface of the sheet and the inner camming surfaces cause the lobes to bend outward. As their cutting edges slit progressively sideward into the sheet metal and form pockets within the metal, the lobes become firmly embedded. The pockets so formed have at each cross-section a lower edge essentially parallel to the lower surface of the sheet.

BRIEF DESCRIPTION OF THE DRAWINGS

FIG. 1 is an enlarged elevational view of a fastener having four lobes, shown prior to driving into a sheet metal workpiece backed by an anvil.

FIG. 2 is an enlarged fragmentary view of the interpenetrating end of the fastener of FIG. 1.

FIG. 3 is a fragmentary sectional view illustrating the fastener after having been driven into the sheet metal, its lobes embedded in pockets in the sheet metal slit and raised by such driving.

FIG. 4 is a further enlarged sectional view of a typical cross section through the lobes, taken along line 4—4 of FIG. 2.

FIG. 5 is a similarly enlarged sectional view taken along line 5—5 of FIG. 3, showing in cross-section a typical lobe as it commences to be embedded in a pocket formed by it in the sheet metal. The single-dotted phantom lines show the lobe cross-section after the fastener has been driven somewhat farther into the sheet with a corresponding rise in the upper surface; the double-dotted phantom lines show these parts after still further driving.

DESCRIPTION OF THE PREFERRED EMBODIMENT

A nailable fastener embodying the present invention, seen in FIG. 1 before its deformation in use, is formed of a somewhat ductile metal as by a conventional heading process. It has a generally cylindrical metal shank 10 whose driving end 11 is blunt, to receive an impact. Slightly below the driving end 11 and disposed, as by swaging, about the shank 10 is an enlarged washer-like head 12 which serves to hold in place an insulating blanket or such other material as it may be desired to secure to sheet metal.

Formed at the opposite end of the shank 10 is an upward concave indentation or cavity 14, as may be formed by the center projection of a conventional heading tool. Outwardly of the shank center are three or more substantially identical lobes, generally designated 15, for being shown in the present embodiment. Using the heading process, these are formed by impact-extrusion of the metal. Referring to the enlarged fragmentary view of FIG. 2, each lobe 15 has an outer surface 16 which is an extension of the generally cylindrical metal shank 10, and an inner camming surface 17 which slopes outward from the indentation 14 to a tip 18. The inner camming surface 17 of each lobe 15 may be planar as shown in FIG. 2, commencing at a level along the shank 10 at which its cylindrical surface portion is uninterrupted and sloping outward and downward at an angle of approximately 20° or greater, or may have some simple curvature, to provide a tip intersection angle no greater than 45°. Every transverse cross-section of a lobe 15 is characterized by being bounded outwardly by a circular arc a of the outer surface 16 and inwardly by a chord b, as illustrated in the enlarged cross-section in FIG. 4.

The line of intersection of each camming surface 17 and the outer surface 16 of each lobe 15 is substantially elliptical, providing a cutting edge 19. At least those portions of the edge 19 near the tip 18 are hardened in a conventional manner, as by induction hardening. The lobe base portions 20, outwardly adjacent to the cavity 14, remain ductile.

A sheet metal work piece 21 into which the fastener is to be nailed is first backed with a harder metal anvil 22, as shown in FIG. 1. Upon impact being applied to the fastener's driving end 11, the tips 18 of the lobes 15 penetrate the surface of the sheet 21; such penetration being facilitated by the hardened tip 18 of each lobe 15.

As the tips 18 penetrate the surface of the sheet 21, the camming surfaces 17 commence to bend the lobes 15 slightly outward radially. Since at every level these surfaces 17 have straight chord lines, as shown in the typical section of FIG. 4, as the penetration continues the radially outward bending of the lobes 15 progresses. Their cutting edges 19 slit progressively sideward as the tips 18 progress radially outward, to form pockets 25 whose bottom portions have substantially simple curvature and whose upper portions have compound curvature, as shown in FIGS. 3 and 5. At any particular cross-section, as the penetration progresses the chord b remains in the same place while the cutting edges 19 slit outward, enlarging the pocket 25, as shown in FIG. 5 by the line 25'. Since the outward spreading occurs not far below the upper surface of the sheet 21, the pockets 25 are readily formed on such slitting, the lobes 15 locally displacing the metal above them and raising the upper surface of the sheet 21 as illustrated.

Variations in detail, design and process of manufacture will be apparent. For example, three larger lobes may be preferred to four shown when the sheet metal thickness is great enough to accommodate them readily. The angle of intersection of the camming surfaces 17 with the outer lobe surfaces 16 may be varied empirically, and the hardening process chosen to meet requirements of manufacture and use. Other modifications and adaptations will from this disclosure suggest themselves to persons skilled in the art.

I claim:

1. A nailable fastener for the spreading interpenetration of sheet metal, comprising:

a metal shank having a driving end portion and an opposite penetrating end portion whose outer surface is generally cylindrical, said opposite end portion being provided with more than two lobes, each of said lobes having an outer surface which forms part of said generally cylindrical surface, and having a single planar inner camming surface commencing at a level along said shank at which its cylindrical surface portion is uninterrupted and sloping outward away from the driving end portion and forming a partial elliptical intersection with said generally cylindrical outer surface, whereby to provide a cutting edge having a rounded tip cutting edge portion, said cutting edge being hardened and the lobe portions inward thereof being of greater ductility, whereby, on backing such sheet metal with a harder metal anvil and driving the fastener therein, the hardened lobe tip portions penetrate the surface of such sheet metal and the lobe camming surfaces bend the ductile lobes outward as their hardened cutting edges slit into and form pockets in the sheet metal within which the bent lobes fit, thereby securing the fastener against withdrawal or tilting.

2. A nailable fastener for the spreading interpenetration of sheet metal, comprising:

a metal shank having a driving end portion and an opposite penetrating end portion whose outer surface is generally cylindrical, said opposite end portion being provided with more than two lobes, each of said lobes being defined by an outer surface which forms part of said generally cylindrical surface and an inner surface which slopes, commencing at a level along said shank at which its cylindrical surface portion in uninterrupted, outwardly to an intersection with said outer surface at an angle no greater than 45°, whereby to provide a camming surface terminating in a rounded tip cutting edge portion, each said lobe being characterized at every transverse cross-section by being bounded outwardly by a circular arc and inwardly by a chord, said intersection of said inner surface with said outer surface being hardened and the lobe portions inward thereof being of greater ductility, whereby on driving to curl the lobe portions outward as the hardened cutting edge portions slit into such sheet metal and raise pockets within which said curled lobes are accommodated.

* * * * *

UNITED STATES PATENT AND TRADEMARK OFFICE
CERTIFICATE OF CORRECTION

PATENT NO. : 4,231,280
DATED : November 4, 1980
INVENTOR(S) : Jerome A. Gross

It is certified that error appears in the above—identified patent and that said Letters Patent is hereby corrected as shown below:

In Claim 2, column 4, line 28, delete "in" and insert ---is---.

Signed and Sealed this

Tenth Day of March 1981

[SEAL]

Attest:

RENE D. TEGTMEYER

Attesting Officer

Acting Commissioner of Patents and Trademarks